Figure 3:
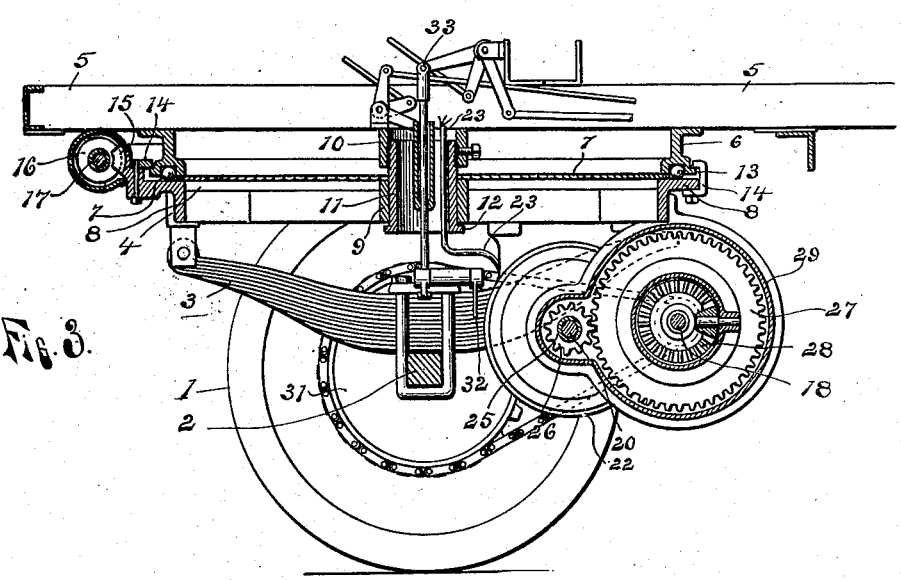

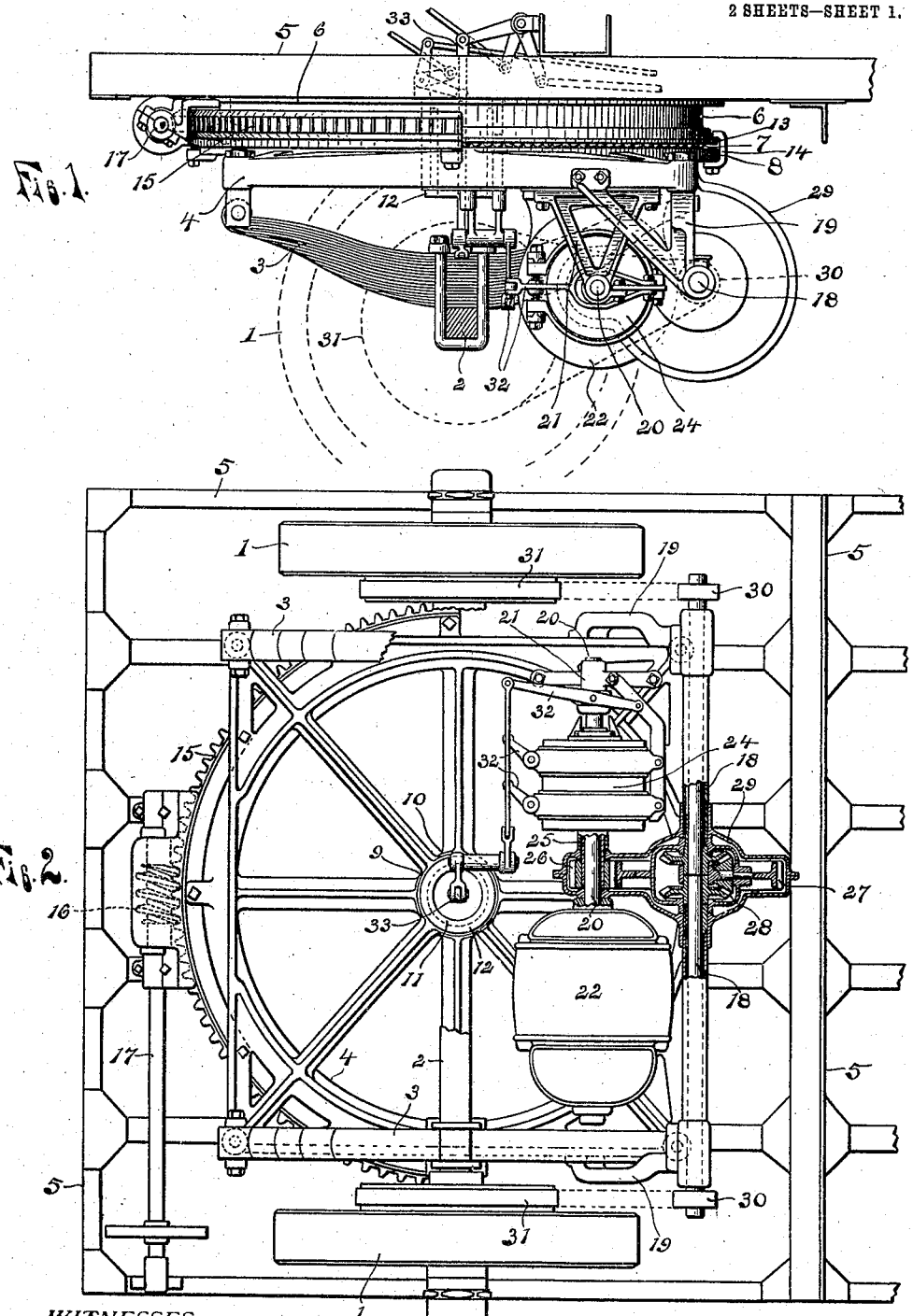

R. FULLER.
MOTOR VEHICLE TRUCK.
APPLICATION FILED NOV. 21, 1906.

900,160.

Patented Oct. 6, 1908.

2 SHEETS—SHEET 2.

WITNESSES:

INVENTOR.
Rodolphus Fuller
BY
ATTORNEYS.

UNITED STATES PATENT OFFICE.

RODOLPHUS FULLER, OF DETROIT, MICHIGAN.

MOTOR-VEHICLE TRUCK.

No. 900,160.

Specification of Letters Patent.

Patented Oct. 6, 19..

Application filed November 21, 1906. Serial No. 344,387.

*To all whom it may concern:*

Be it known that I, RODOLPHUS FULLER, a citizen of the United States of America, residing at Detroit, in the county of Wayne and State of Michigan, have invented certain new and useful Improvements in Motor-Vehicle Trucks, of which the following is a specification, reference being had therein to the accompanying drawings.
This invention relates to improvements in motor vehicles and more especially to two-wheeled trucks for self propelled vehicles which are designed to carry heavy loads and which trucks are provided with their own means of propulsion carried independently of the vehicle frame or body.

The object of the invention is to provide a very compact and convenient arrangement of the parts which is such as to permit of the employment of a variable-speed-transmission gearing between the motor and driven shaft, which shaft is so positioned and arranged as to permit of the use in conjunction therewith, of the ordinary form of differential gearing.

It is also an object of the invention to so arrange the motor and transmission that power will be transmitted to the driven shaft as directly as possible consistent with compactness of arrangement, and so as to distribute the weight of the parts and permit of a convenient arrangement of levers for operating the transmission gearing.

A further object of the invention is to prevent the transmission of undue vibration from the axle of the motor and driving mechanism, by so constructing and arranging said parts as to adapt them to be suspended from or supported by the truck frame which is spring supported upon the axle, and to provide a construction having the several other advantages of the particular construction, arrangement and combination of parts, all as hereinafter more fully described reference being had to the accompanying drawings in which Figure 1. is a side elevation of a device embodying the invention, with the wheels removed; Fig. 2 a plan view of the same in an inverted position with parts broken away to show the construction; and Fig. 3 is a longitudinal vertical section.

As shown in the drawings, 1, 1 are the driving wheels of the truck mounted upon the ends of the axle 2 which supports by means of springs 3 secured thereto by clips, the truck frame 4. A suitable body or load carrying frame 5 made up of longitudinal and transverse channel bars has secured to its lower side the upper member 6 of a fifth wheel or circle which member is formed with a groove to receive a series of balls 7 which run upon the lower member 8 of the fifth wheel or circle, said member 8 being cast integral with and forming a part of the truck frame.

Each member of the fifth wheel if formed with spokes connecting its circular track portion with its hub, the bore of the hub 9 of the lower member being smooth and that of the hub 10 of the upper member being screw-threaded to receive the externally screw-threaded end of a tubular member 11 which extends through and turns freely in the hub 9 and forms the king pin of the fifth wheel, said king pin being provided with an outwardly extending flange 12 at its lower end to engage the end of the hub and secure the two members of the circle together. On the upper member of the circle is an outwardly extending flange 13 and hooks or clips 14 on the lower member extend upward and over the flange to further hold the two members in position.

Secured to the forward side of the member 8 of the fifth wheel or circle is a semi-circular rack or gear 15 engaged by a worm 16 secured upon a transverse shaft 17 mounted in bearings on the body or load frame 5, which shaft may be turned in any convenient manner to actuate the worm and rotate the lower member of the fifth wheel which being supported upon and secured to the axle will turn the axle to guide the vehicle.

Extending transversely of the vehicle at the extreme rear side of the truck frame 4 and a short distance above the horizontal plane of the axle, is a shaft 18 mounted in bearings at its outer ends on hangers 19 secured to and extending downward from the truck frame, and arranged parallel with this shaft, between it and the axle is a driving shaft 20 mounted in bearings upon hangers 21 also secured to the truck frame. Mounted upon this driving shaft at one side of the longitudinal center line of the truck is an electric motor 22 to actuate said shaft, said motor receiving its current from any suitable source of supply through a cable 23 extending up through the hollow king pin of the truck, and upon the other end of said shaft at the opposite side of the truck is mounted a variable speed power transmitting device 24 of any suitable construction. Upon the driving shaft is a sleeve 25 extending from the transmission gearing toward the motor, the motion of the shaft being changed and imparted to this sleeve by the said gearing, and on the end of said sleeve at substantially the center of the truck is a pinion 26 in mesh with a large gear 27 connected by differential gearing 28 of any suitable arrangement to the two parts of the driven shaft 18 which is divided at the center of said gear. A suitable casing 29 incloses said gears and differential and is secured to the truck frame to form a bearing support for the adjacent ends of the divided driven shaft. On the outer ends of the driven shaft are small sprocket wheels 30 engaged by sprocket chains passing over large sprockets 31 secured upon the hubs of the driving wheels to transmit motion from each part of the driven shaft to each wheel.

Suitable levers 32 controlling the operation of the transmission gearing are actuated by a rod or rods 33 extending upward through the tubular king pin in the axis of movement of the truck so that the truck may be turned without interfering with the operation of said rods.

Having thus fully described the invention what I claim is:

1. In a truck for electric motor vehicle, the combination with a fixed axle and independent driving wheels thereon, of a drive shaft and a driven shaft substantially in the horizontal plane of the axle and in rear thereof, the driven shaft being in rear of the drive shaft and centrally provided with a differential gear, an electric motor upon one end of the drive shaft, a variable speed transmission gear upon the other end of said shaft and a drive pinion sleeved upon said shaft between the motor and said variable transmission gear and transmitting motion from the transmitting gear to the differential.

2. In a truck for electric motor vehicle, the combination with a fixed axle having independent wheels and a truck frame supported by springs upon the axle, of a drive mechanism comprising a drive shaft and a driven shaft supported in fixed connection with the truck frame in rear of the axle independently thereof, the driven shaft being in rear of the drive shaft and centrally provided with a differential gear, an electric motor upon one end of the drive shaft, a variable speed transmission gear upon the other end of said shaft, and a drive pinion upon said shaft between the motor and variable speed transmission gear, said pinion provided with a sleeve connecting the pinion with the transmission gear.

3. In a truck for motor vehicles, the combination with an axle and drive wheels on said axle, of springs secured to the axle, a truck frame attached to and supported by said springs and provided with a central hub portion, a bearing circle for the truck consisting of a lower circular member formed integral with the truck frame and an upper circular member formed with a ball bearing groove, and with a central hub portion corresponding to the hub portion of the truck frame, balls in said groove, an outwardly projecting flange on the upper member, clips on the lower member projecting upward and over said flange, a tubular king pin extending through both hub portions and pivotally connecting the hub portions together, and drive mechanism comprising an electric motor suspended from the said truck frame and having its electrical connections extending upward through the king pin and a variable speed gearing suspended from the truck frame, and provided with operating connections extending upward through the king pin.

4. In a truck for motor vehicles, the combination with a fixed axle and driving wheels mounted to turn freely thereon, of a divided shaft extending transversely of the truck, differential gearing connecting the divided ends of said shaft, sprockets on the outer ends of said shaft, sprockets on the hubs of the wheels, sprocket chains engaging said sprockets, a driving shaft extending parallel with the divided shaft between said shaft and the axle, a motor mounted on said driving shaft at one side of the differential, a sleeve on the other end of said driving shaft, a pinion on said sleeve to transmit motion to the differential, and a change speed gearing on the sleeve connecting the same with the driving shaft.

5. In a truck for motor vehicles, the combination with the axle and drive wheels, of a truck frame spring supported upon the axle, a circle on the truck frame consisting of two parts having hub portions, a tubular king pin extending through the hubs to connect the parts, an electric motor supported by the truck frame independently of the axle and having its electrical connections with its source of energy extending upward through said king pin, means for transmitting motion to turn the driving wheels, a variable speed gearing carried by the truck frame to transmit motion from the motor to said means, and means for operating said variable speed gearing extending upward through the tubular king pin.

6. In a truck for motor vehicles, the combination with a fixed axle and drive wheels mounted to turn freely on said axle, of springs secured to the axle, a truck frame attached to and supported by said springs, a circle on said frame, hangers extending downward from the rear side of the frame and provided with bearings, a divided shaft mounted in said bearings, a differential gearing connecting the divided ends of said shaft, a casing inclosing said differential and formed with bearings for the said ends of the divided shaft said casing being secured to the truck frame, sprockets on the outer ends of the divided shaft, sprockets on the drive wheels and sprocket chains engaging said sprockets, a driving shaft extending parallel with the divided shaft between said shaft and axle, an electric motor on one end of said shaft, a variable speed transmission gear on the other end of said shaft and a drive pinion between said motor and variable speed transmission gear and transmitting motion to the differential, said drive pinion provided with a sleeve connecting it with the transmission gear.

In testimony whereof I affix my signature in presence of two witnesses.

RODOLPHUS FULLER.

Witnesses:
 OTTO F. BARTHEL,
 ANNA M. DORR